United States Patent
Ikuta

(10) Patent No.: US 11,772,544 B2
(45) Date of Patent: Oct. 3, 2023

(54) LIGHT DISTRIBUTION CONTROL DEVICE HAVING DIFFUSION CONTROLLER THAT SELECTIVELY IRRADIATES AREAS

(71) Applicant: TOYOTA JIDOSHA KABUSHIKI KAISHA, Toyota (JP)

(72) Inventor: Tetsuya Ikuta, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/959,591

(22) Filed: Oct. 4, 2022

(65) Prior Publication Data

US 2023/0122166 A1   Apr. 20, 2023

(30) Foreign Application Priority Data

Oct. 19, 2021   (JP) ................. 2021-170912

(51) Int. Cl.
*B60Q 1/08* (2006.01)
*B60Q 1/00* (2006.01)
*F21S 41/663* (2018.01)

(52) U.S. Cl.
CPC ........... *B60Q 1/085* (2013.01); *B60Q 1/0023* (2013.01); *F21S 41/663* (2018.01); *B60Q 2300/322* (2013.01); *B60Q 2300/45* (2013.01)

(58) Field of Classification Search
CPC ........ F21S 41/663; F21S 41/153; B60Q 1/08; B60Q 1/085; B60Q 1/0023
See application file for complete search history.

(56) References Cited

U.S. PATENT DOCUMENTS

| 7,150,552 B2 * | 12/2006 | Weidel ................ F21S 41/151 362/800 |
| 2009/0041300 A1 * | 2/2009 | Mack .................... B60Q 1/085 382/103 |

FOREIGN PATENT DOCUMENTS

| JP | 2002-052976 A | 2/2002 |
| JP | 2020-026245 A | 2/2020 |
| JP | 2021-049822 A | 4/2021 |

* cited by examiner

*Primary Examiner* — Robert J May
(74) *Attorney, Agent, or Firm* — Sughrue Mion, PLLC

(57) ABSTRACT

A light distribution control device can perform diffused light distribution control designed to widen an irradiation range of a headlamp of an own vehicle. The light distribution control device is equipped with a recognition unit that recognizes a situation around the own vehicle, and a control unit that performs diffused light distribution control when a curve section in front of the own vehicle in a traveling direction thereof is detected, from a result of recognition by the recognition unit. The control unit controls the headlamp such that a non-required irradiation region where irradiation with light is not required is restrained from being irradiated with light and that a region other than the non-required irradiation region is irradiated with more light, when the non-required irradiation region is detected in the irradiation range of the headlamp in performing diffused light distribution control, from the result of recognition.

5 Claims, 3 Drawing Sheets

LIGHT DISTRIBUTION CONTROL DEVICE HAVING DIFFUSION CONTROLLER THAT SELECTIVELY IRRADIATES AREAS

CROSS-REFERENCE TO RELATED APPLICATION

This application claims priority to Japanese Patent Application No. 2021-170912 filed on Oct. 19, 2021, incorporated herein by reference in its entirety.

BACKGROUND

1. Technical Field

The disclosure relates to the technical field of a light distribution control device that performs light distribution control of a headlamp of a vehicle.

2. Description of Related Art

As this kind of device, there is proposed, for example, a device that selects a swivel angle in accordance with a steering angle and a speed of a vehicle and that changes the orientation of an optical axis of a headlamp based on the swivel angle (see Japanese Unexamined Patent Application Publication No. 2021-049822 (JP 2021-049822 A)). As other related arts, it is possible to mention Japanese Unexamined Patent Application Publication No. 2020-026245 (JP 2020-026245 A) and Japanese Unexamined Patent Application Publication No. 2002-052976 (JP 2002-052976 A). In JP 2020-026245 A, there is described a device that changes the orientation of an optical axis of a headlamp in a turning direction of a vehicle and that changes the orientation of the optical axis of the headlamp such that light is distributed oppositely to the turning direction when the vehicle changes lanes in a straight section. In JP 2002-052976 A, there is described a device that controls a headlamp from a light-concentrating state to a light-diffusing state when a driver's operation of decelerating a vehicle before entering a curve in front of the vehicle in a traveling direction thereof is detected.

SUMMARY

The art described in JP 2021-049822 A has the following technical problem. That is, the orientation of the optical axis of the headlamp is changed in such a manner as to illuminate, for example, a region in the turning direction of the vehicle. As a result, a region located opposite the turning direction is darkened, which makes it difficult for a driver to notice pedestrians and obstacles present in that region.

The disclosure has been made in view of the foregoing problem. It is a task of the disclosure to propose a light distribution control device that can perform appropriate light distribution control corresponding to a running situation of a vehicle.

A light distribution control device according to one aspect of the disclosure is a light distribution control device that can perform diffused light distribution control designed to widen an irradiation range of a headlamp of an own vehicle. The light distribution control device is equipped with a recognition unit that recognizes a situation around the own vehicle, and a control unit that performs the diffused light distribution control when a curve section in front of the own vehicle in a traveling direction thereof is detected, from a result of recognition by the recognition unit. The control unit controls the headlamp such that a non-required irradiation region in which irradiation with light is not required is restrained from being irradiated with light and that a region other than the non-required irradiation region is irradiated with more light, when the non-required irradiation region is detected in the irradiation range of the headlamp in performing the diffused light distribution control, from the result of recognition.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
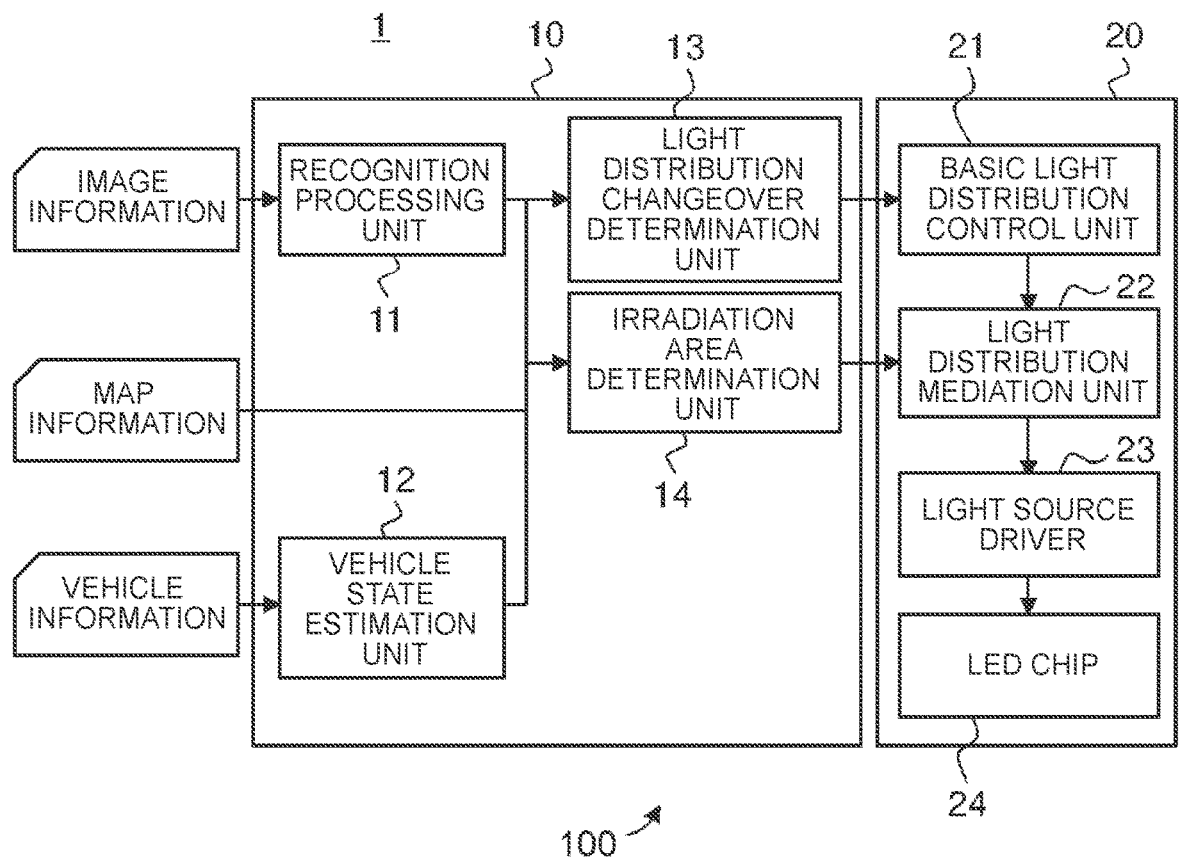
FIG. 1 is a block diagram showing the configuration of a light distribution control device according to one of the embodiments.

A light distribution control device according to one of the embodiments will be described with reference to FIGS. 1 to 5. In FIG. 1, a light distribution control device 100 is mounted in a vehicle 1. The light distribution control device 100 is configured to be equipped with a control device 10 and a headlamp unit 20.

The control device 10 may be configured as, for example, an electronic control unit (ECU). The control device 10 has a recognition processing unit 11, a vehicle state estimation unit 12, a light distribution changeover determination unit 13, and an irradiation area determination unit 14 as logical blocks that are realized logically, or processing circuits that are realized physically.

The headlamp unit 20 has a basic light distribution control unit 21, a light distribution mediation unit 22, a light source driver 23, and a light emitting diode (LED) chip 24. Incidentally, the vehicle 1 is often equipped with a pair of headlamp units. However, with a view to preventing the description from becoming complicated, only the single headlamp unit 20 is depicted.

In the present embodiment, an LED array chip including a plurality of LED elements (LED1, LED2, LED3, LED4, LED5, LED6, . . . in FIG. 2) is cited as an example of the LED chip 24.

Figure 2:
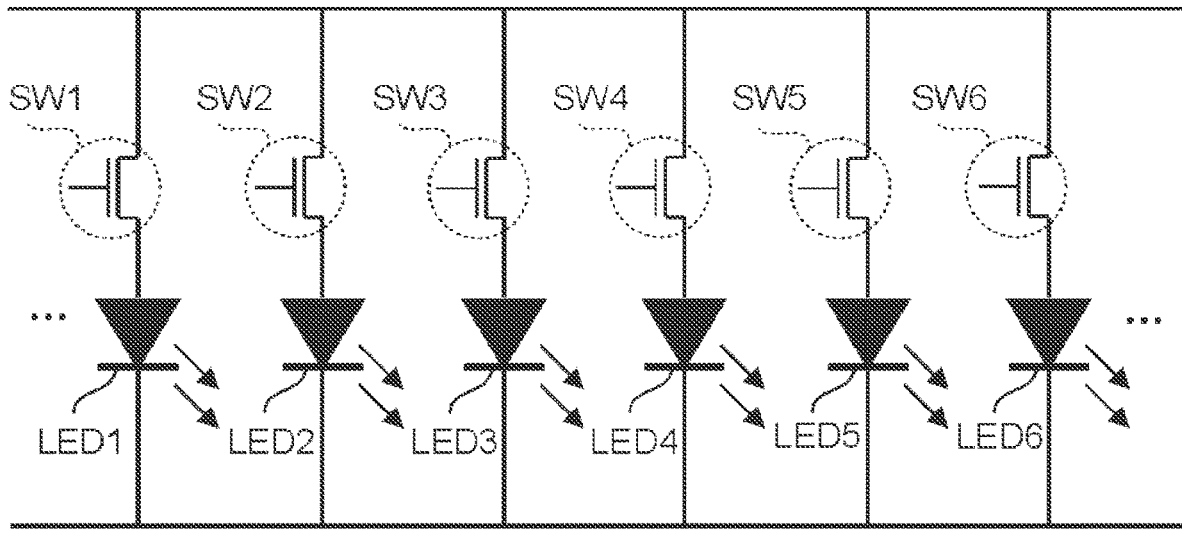
FIG. 2 is an example of a circuit diagram of an LED chip according to the embodiment.

As shown in FIG. 2, a switch SW1 is electrically connected in series to the LED element LED1. A switch SW2 is electrically connected in series to the LED element LED2. A switch SW3 is electrically connected in series to the LED element LED3. A switch SW4 is electrically connected in series to the LED element LED4. A switch SW5 is electrically connected in series to the LED element LED5. A switch SW6 is electrically connected in series to the LED element LED6.

The light source driver 23 changes over each of the switches SW1, SW2, SW3, SW4, SW5, SW6, etc. between ON and OFF. In particular, the light source driver 23 controls the duty ratio of each of the switches SW1, SW2, SW3, SW4, SW5, SW6, etc. That is, the light source driver 23 performs pulse width modulation (PWM) control of the LED chip 24.

Returning to FIG. 1, the basic light distribution control unit 21 decides the light distribution mode regarding the headlamp unit 20, in accordance with instructions from the light distribution changeover determination unit 13 of the control device 10. It should be noted herein that the headlamp unit 20 is configured to be able to realize a normal light distribution mode corresponding to light distribution as shown in, for example, FIG. 3A, and a diffused light distribution mode with a wider irradiation range in a width direction of the vehicle 1 than in the normal light distribution mode as shown in, for example, FIG. 3B. The basic light distribution control unit 21 decides the light distribution mode by selecting either the normal light distribution mode or the diffused light distribution mode in accordance with instructions from the light distribution changeover determination unit 13. Incidentally, an example of the irradiation range is depicted as a range surrounded by dotted lines in each of FIG. 3A and FIG. 3B.

It should be noted herein that optical axes of the LED elements (LED1 and the like in FIG. 2) included in the LED array chip as the LED chip 24 may be fixed. That is, the LED chip 24 may not have a swivel function that makes it possible to change the directions of the optical axes. In this case, the irradiation range shown in, for example, FIG. 3A may be realized through the lighting of only one or some of the LED elements included in the LED array chip, in the normal light distribution mode. Besides, the irradiation range shown in, for example, FIG. 3B may be realized through the lighting of all the LED elements included in the LED array chip, in the diffused light distribution mode.

The light distribution mediation unit 22 conducts a mediation between instructions from the irradiation area determination unit 14 of the control device 10 and instructions from the basic light distribution control unit 21, when the diffused light distribution mode is selected by the basic light distribution control unit 21. The concrete description of the mediation conducted by the light distribution mediation unit 22 will be given later.

The recognition processing unit 11 of the control device 10 acquires image information acquired by an in-vehicle camera (not shown). The recognition processing unit 11 subjects the image information to a predetermined recognition process to recognize a situation around the vehicle 1 (e.g., the presence or absence of obstacles or pedestrians). Incidentally, various existing modes are applicable to the recognition process, so the detailed description thereof will be omitted.

The vehicle state estimation unit 12 acquires vehicle information including measurement results of various in-vehicle sensors, for example, a speed sensor, an acceleration sensor, and a steering angle sensor. The vehicle state estimation unit 12 estimates a state of the vehicle 1 based on the vehicle information.

The light distribution changeover determination unit 13 determines whether or not a changeover between the normal light distribution mode and the diffused light distribution mode should be made, based on at least one of a result of the recognition process by the recognition processing unit 11, a result of estimation by the vehicle state estimation unit 12, and map information, when headlamps of the vehicle 1 are lit.

Incidentally, the headlamps of the vehicle 1 may be changed over between lighting and extinction through an operation by a driver of the vehicle 1, or may be automatically changed over between lighting and extinction based on, for example, an output of an illuminance sensor.

The light distribution changeover determination unit 13 may determine that a changeover from the normal light distribution mode to the diffused light distribution mode should be made, when the vehicle 1 is predicted to enter a curve section, based on, for example, the map information. The light distribution changeover determination unit 13 may predict that the vehicle 1 will enter the curve section, based on the result of the recognition process by the recognition processing unit 11 instead of or in addition to the map information, when a white line on a road is detected from the result of the recognition process.

The light distribution changeover determination unit 13 may determine that a changeover from the diffused light distribution mode to the normal light distribution mode should be made, when it is sensed that the vehicle 1 has entered a straight section from the curve section, based on, for example, the result of estimation by the vehicle state estimation unit 12.

The light distribution changeover determination unit 13 may determine that a changeover from the normal light distribution mode to the diffused light distribution mode should be made, when the vehicle 1 runs at a relatively low speed (e.g., at a speed equal to or lower than 30 km/h), based on, for example, the result of estimation by the vehicle state estimation unit 12.

The light distribution changeover determination unit 13 may determine that a changeover from the normal light distribution mode to the diffused light distribution mode should be made, when it is sensed that the vehicle 1 runs on a road with a relatively narrow road width and relatively poor visibility (e.g., a so-called community road), based on, for example, the map information.

Incidentally, the foregoing condition for making a changeover between the normal light distribution mode and the diffused light distribution mode is an example, and the disclosure should not be limited thereto.

The irradiation area determination unit 14 makes a determination on a non-required irradiation area in which irradiation with light is not required, in an irradiation range regarding the diffused light distribution mode, based on at least one of the result of the recognition process by the recognition processing unit 11, the result of estimation by the vehicle state estimation unit 12, and the map information, when the headlamps of the vehicle 1 are lit and the diffused light distribution mode is selected.

As an example of the non-required irradiation area, it is possible to mention an area (space) above a relatively high wall or fence (e.g., with a height equal to or higher than one meter). That is, as an example of the non-required irradiation area, it is possible to mention an area in which what has passed through the area is extremely unlikely to pop out in front of the vehicle 1 or collide with the vehicle 1. Incidentally, the non-required irradiation area is not limited to the foregoing, but may be set as appropriate.

The irradiation area determination unit 14 may transmit instructions indicating a required irradiation area in which irradiation with light is required in the irradiation range regarding the diffused light distribution mode, to the light distribution mediation unit 22 of the lamp unit 20. Alternatively, the irradiation area determination unit 14 may transmit instructions indicating the non-required irradiation area in the irradiation range regarding the diffused light distribution mode, to the light distribution mediation unit 22. Incidentally, the irradiation area determination unit 14 may not transmit instructions (or a signal) to the light distribution mediation unit 22, when it is determined that there is no non-required irradiation area.

Upon receiving the instructions indicating the required irradiation area or the non-required irradiation area from the irradiation area determination unit 14, the light distribution mediation unit 22 identifies that one of the LED elements included in the LED array chip as the LED chip 24 which should be reduced in light or extinguished. The light distribution mediation unit 22 then transmits instructions to decrease the duty ratio regarding the identified LED element or turn OFF the switch for the identified LED element, to the light source driver 23.

It should be noted herein that since the LED element with the switch turned OFF is extinguished, the area irradiated with light from the LED element (i.e., the non-required irradiation area) stops being irradiated with light. In the present embodiment, this is referred to as "the blocking of light" as appropriate.

Furthermore, the light distribution mediation unit 22 may transmit instructions to increase the duty ratio regarding the LED elements included in the LED array chip other than the identified LED element, to the light source driver 23.

In this case, the light distribution mediation unit 22 is desired to set the duty ratios regarding the respective LED elements such that an increase in amount of electric power resulting from an increase in the duty ratio regarding the LED elements other than the identified LED element and a decrease in amount of electric power resulting from a decrease in the duty ratio regarding the identified LED element or the turning OFF thereof become approximately equal to each other.

Figure 3A:
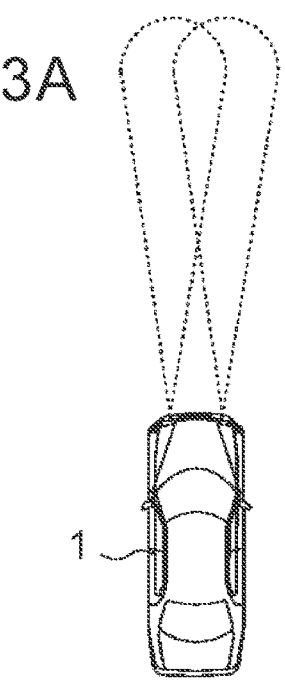
FIG. 3A is a view showing an example of a light distribution mode according to the embodiment.
Figure 3B:
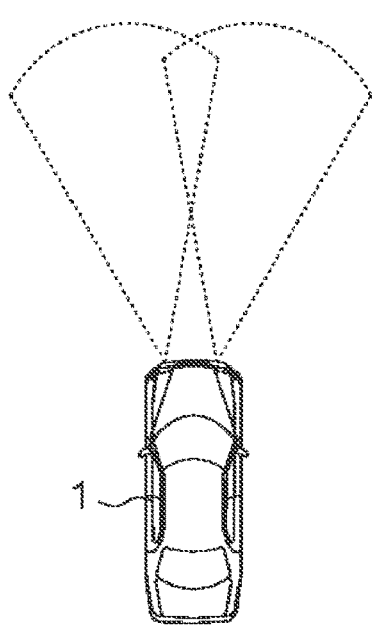
FIG. 3B is a view showing another example of the light distribution mode according to the embodiment.
Figure 4:
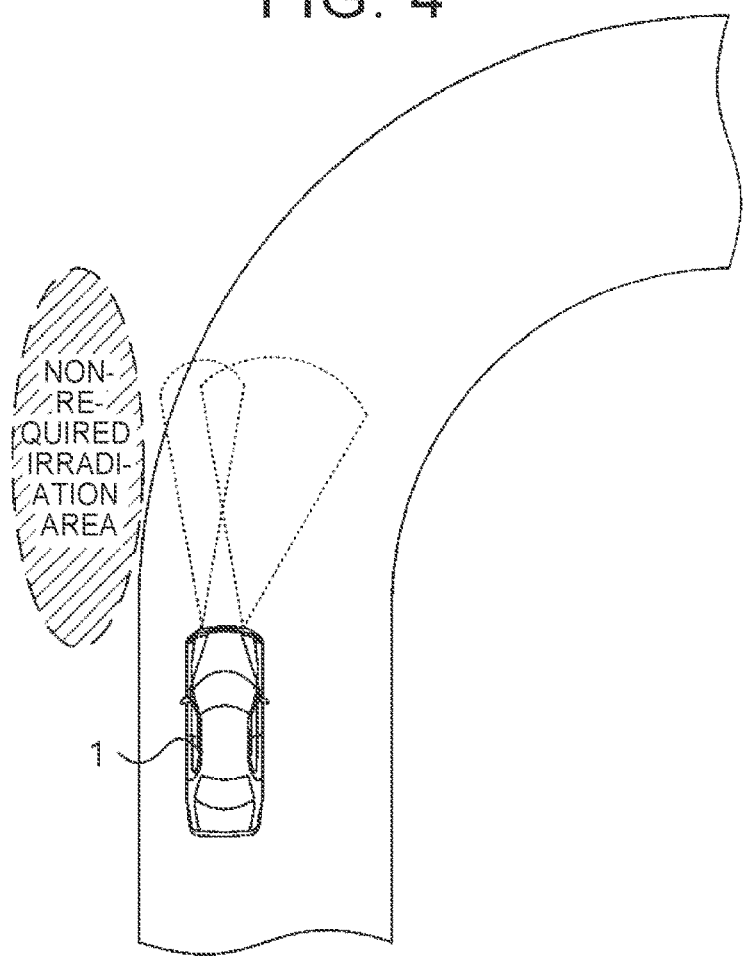
FIG. 4 is a view showing still another example of the light distribution mode according to the embodiment.

As shown in FIG. 4, when there is a non-required irradiation area, for example, in front of and to the left of the vehicle 1, the light distribution mediation unit 22 transmits instructions to decrease the duty ratio regarding that one of the LED elements included in the LED array chip which irradiates the non-required irradiation area with light or turn OFF the switch for that LED element, to the light source driver 23. As a result, the irradiation range in front of and to the left of the vehicle 1 becomes narrower than in the diffused light distribution mode shown in FIG. 3B.

In addition, when the light distribution mediation unit 22 transmits instructions to increase the duty ratio regarding the LED elements included in the LED array chip other than the LED element irradiating the non-required irradiation area with light, to the light source driver 23, an irradiation range shown in FIG. 4 (a region surrounded by dotted lines) becomes brighter than the irradiation range in the diffused light distribution mode shown in FIG. 3B.

Figure 5:
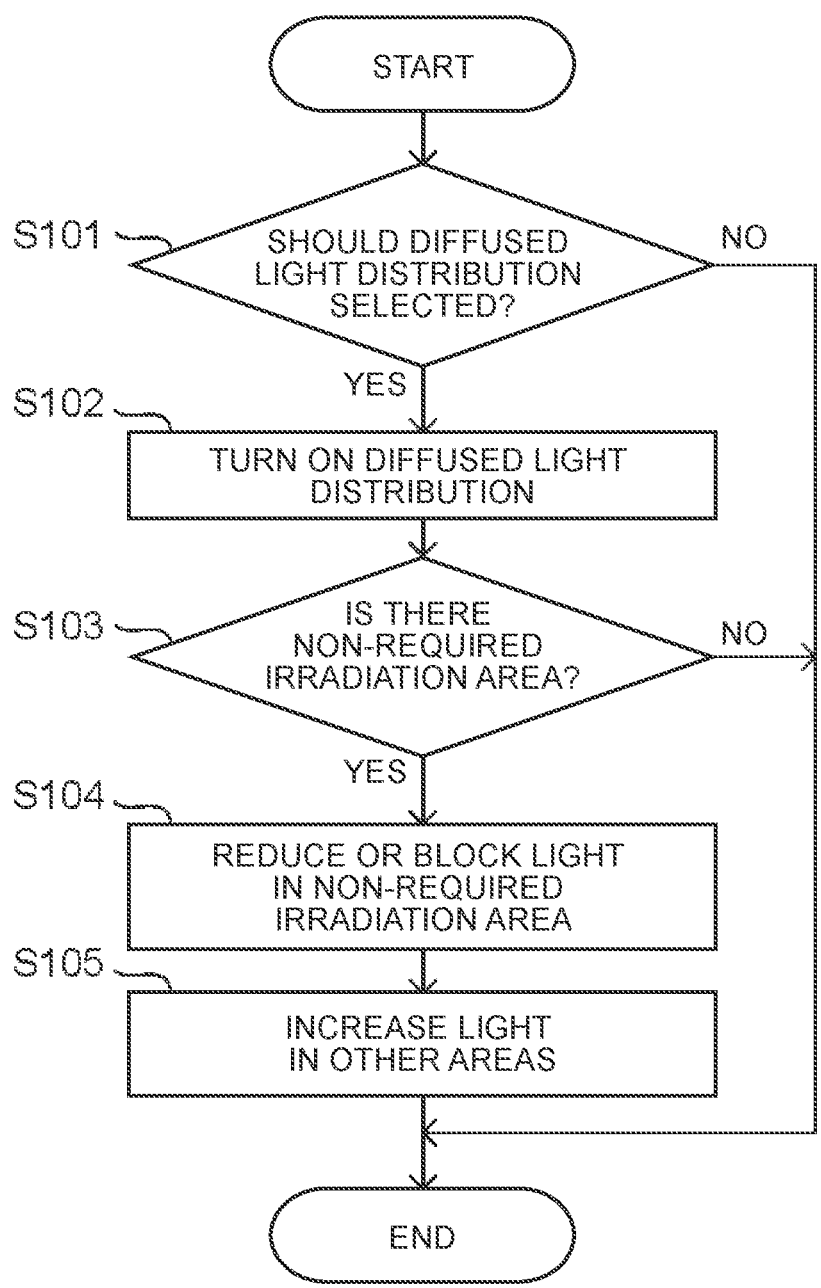
FIG. 5 is a flowchart showing the behavior of the light distribution control device according to the embodiment.

Next, the behavior of the light distribution control device 100 will be described with reference to a flowchart of FIG. 5. In FIG. 5, the light distribution changeover determination unit 13 of the control device 10 determines whether or not the light distribution mode regarding the headlamps should be the diffused light distribution mode (step S101).

If it is determined in the processing of step S101 that the light distribution mode regarding the headlamps should not be the diffused light distribution mode (No in step S101), the normal light distribution mode is selected as the light distribution mode regarding the headlamps of the vehicle 1, and the behavior shown in FIG. 5 is ended. Then after the lapse of a predetermined time (e.g., several tens of milliseconds to several hundreds of milliseconds), the processing of step S101 may be performed again. That is, the behavior shown in FIG. 5 may be repeatedly carried out on a cycle corresponding to the predetermined time.

If it is determined in the processing of step S101 that the light distribution mode regarding the headlamps of the vehicle 1 should be the diffused light distribution mode (Yes in step S101), the diffused light distribution mode is selected as the light distribution mode regarding the headlamps of the vehicle 1 (step S102).

Subsequently, the irradiation area determination unit 14 of the control device 10 determines whether or not there is a non-required irradiation area (step S103). If it is determined in the processing of step S103 that there is no non-required irradiation area (No in step S103), the diffused light distribution mode is maintained, and the behavior shown in FIG. 5 is ended. Then after the lapse of a predetermined time, the processing of step S101 may be performed again.

If it is determined in the processing of step S103 that there is a non-required irradiation area (Yes in step S103), the light distribution mediation unit 22 of the lamp unit 20 identifies that one of the LED elements included in the LED array chip as the LED chip 24 which should be reduced in light or extinguished. The light distribution mediation unit 22 then transmits instructions to decrease the duty ratio regarding the identified LED element or turn OFF the switch for the identified LED element, to the light source driver 23 (step S104).

The light distribution mediation unit 22 further transmits instructions to increase the duty ratio regarding the LED elements included in the LED array chip other than the identified LED element, to the light source driver 23 (step S105).

(Technical Effects)

According to the light distribution control device 100 described above, the diffused light distribution mode is selected as the light distribution mode of the headlamps of the vehicle 1 when the selection of the diffused light distribution mode is required (see step S102 of FIG. 5). After that, when there is a non-required irradiation area, the non-required irradiation area is reduced in light or blocked from light. That is, in the light distribution control device 100, it is determined whether or not there is a non-required irradiation area, after the diffused light distribution mode is selected.

By adopting this configuration, the following advantages are obtained. For example, when the irradiation area determination unit 14 of the control device 10 makes a determination on a non-required irradiation area based on at least the result of the recognition process by the recognition processing unit 11, the image information acquired by the in-vehicle camera in a situation where a relatively wide range is irradiated with light as a result of the diffused light distribution mode is subjected to the recognition process. Therefore, the irradiation area determination unit 14 can appropriately make a determination on a non-required irradiation area.

In the light distribution control device 100, the duty ratio regarding the LED element irradiating an area in which irradiation with light is required in the irradiation range regarding the diffused light distribution mode (in other words, an area other than the non-required irradiation area) may be increased. By adopting this configuration, the area in which irradiation with light is required can be illuminated brighter, so the visibility of the driver of the vehicle 1 can be enhanced.

As described hitherto, according to the light distribution control device 100, appropriate light distribution control corresponding to the running situation of the vehicle can be performed.

The aspects of the disclosure derived from the embodiment described above will be described below.

A light distribution control device according to one of the aspects of the disclosure is a light distribution control device that can perform diffused light distribution control designed to widen an irradiation range of a headlamp of an own vehicle. The light distribution control device is equipped with a recognition unit that recognizes a situation around the own vehicle, and a control unit that performs the diffused light distribution control when a curve section in front of the own vehicle in a traveling direction thereof is detected, from a result of recognition by the recognition unit. The control unit controls the headlamp such that a non-required irradiation region in which irradiation with light is not required is restrained from being irradiated with light and that a region other than the non-required irradiation region is irradiated with more light, when the non-required irradiation region is detected in the irradiation range of the headlamp in performing the diffused light distribution control, from the result of recognition.

In the foregoing embodiment, "the recognition processing unit 11" corresponds to an example of "the recognition unit", "the light distribution changeover determination unit 13", "the irradiation area determination unit 14", and "the light distribution mediation unit 22" correspond to an example of "the control unit", and "the non-required irradiation area" corresponds to an example of "the non-required irradiation region".

In the light distribution control device, the headlamp may include a plurality of light sources. The control unit may reduce an amount of electric power supplied to at least one of the light sources irradiating the non-required irradiation region with light, and increase an amount of electric power supplied to at least one of the light sources irradiating the region other than the non-required irradiation region with light, when the non-required irradiation region is detected.

The disclosure is not limited to the foregoing embodiment, but can be subjected to alterations as appropriate, within such a range as not to contradict the gist or idea of the disclosure that can be read from the claims and the entire specification. The light distribution control device subjected to such alterations also falls within the technical scope of the disclosure. The disclosure is also applicable to autonomous driving vehicles.

What is claimed is:

1. A light distribution control device that is able to perform diffused light distribution control designed to widen an irradiation range of a headlamp of an own vehicle, the light distribution control device comprising:
    a recognition unit configured to perform first recognition to recognize a situation around the own vehicle; and
    a control unit configured to perform the diffused light distribution control when a curve section in front of the own vehicle in a traveling direction of the own vehicle is detected, as a result of the first recognition by the recognition unit, wherein:
    the recognition unit is configured to perform second recognition based on an image captured by an in-vehicle camera that is configured to capture the image in a situation where the headlamp is lit and the control unit is performing the diffused light distribution control by the control unit; and
    the control unit is configured to control the headlamp such that a non-required irradiation region, in which irradiation with light is not required, is restrained from being irradiated with light and that a region other than the non-required irradiation region is irradiated with more light, when the non-required irradiation region is detected as a result of the second recognition.

2. The light distribution control device according to claim 1, wherein
    the headlamp includes a plurality of light sources, and
    the control unit reduces an amount of electric power supplied to at least one of the light sources irradiating the non-required irradiation region with light, and increases an amount of electric power supplied to at least one of the light sources irradiating the region other than the non-required irradiation region with light, when the non-required irradiation region is detected.

3. The light distribution control device according to claim 1, wherein
    the non-required irradiation region includes an area above a wall or fence.

4. The light distribution control device according to claim 1, wherein
    when the non-required irradiation region is detected from the result of the second recognition, the control unit is configured to decrease a first duty ratio regarding a first element included in the headlamp, the first element irradiating the non-required irradiation region.

5. The light distribution control device according to claim 4, wherein:
    the control unit is configured to increase a second duty ratio regarding a second element included in the headlamp, the second element being different from the first element; and
    the control unit is configured to set the first duty ratio and the second duty ratio, such that a decrease in amount of electric power resulting from a decrease in the first duty ratio becomes approximately equal to an increase in amount of electric power resulting from an increase in the second duty ratio.

* * * * *